United States Patent Office 3,436,183
Patented Apr. 1, 1969

3,436,183
METHOD FOR PREPARING DIAMOND CRYSTALS
Masao Wakatsuki and Toshio Aoki, Yokohama-shi, and Nobuyuki Wakamatsu and Shinichiro Takasu, Tokyo, Japan, assignors to Tokyo Shibaura Electric Co., Ltd., Kawasaki-shi, Japan, a corporation of Japan
Filed July 25, 1966, Ser. No. 567,743
Claims priority, application Japan, July 31, 1965, 40/46,423
Int. Cl. C01b 31/06
U.S. Cl. 23—209.1                 6 Claims

ABSTRACT OF THE DISCLOSURE

A method of producing diamond crystals from a carbonaceous material which is subjected to a temperature of over 1,200° C. and a pressure of over 50,000 atm. in the presence of niobium metal with or without at least one metal selected from the group consisting of copper, silver, gold, aluminum, zinc and tin, mixed or alloyed therewith.

---

This invention relates to a method of preparing artificial diamonds of excellent quality with a novel catalyst instead of known catalysts used in the conventional production methods for artificial diamond crystals wherein carbonaceous materials stand in contact with the known catalysts under a pressure of several tens of thousands of atmospheres pressure and a temperature of several thousands degrees centigrade.

Diamond, which has a great variety of uses including decorative or industrial applications, is unfortunately so limited in the amount of natural yield that it can scarcely meet all the demands at present, moreover, high quality diamond crystals suitable for those applications account for only a very small portion of naturally produced diamonds, and it is almost impossible to increase this natural production. Hence, a technique of artificially converting carbonaceous materials into diamond crystals has hitherto been developed. Thus, according to thermodynamic studies, it was known that graphite could be transformed into diamond crystals by subjecting it to a very high pressure and temperature. However, in the actual application of this transformation technique, a high pressure of at least 130,000 atm. and a high temperature of 4,000° C. are required, and many problems to be resolved are also involved in the techniques of designing and operating the transformation device, that it is far from practical. The pressures and temperatures practically available are lower than 100,000 atm. and 2,000° C. respectively. Thus, a catalyst capable of lowering the range of pressure and temperature in the production of artificial diamonds was sought, and iron family elements such as nickel, cobalt and iron were found practical as such catalysts. For example, if graphite is allowed to stand in contact with nickel under a pressure of 70,000 atm. and at a temperature of 1,600 to 1,800° C. for about 1 minute, crystals of artificial diamond can be obtained. Under these conditions, however, it is very difficult to grow colorless and transparent crystals of a large grain and also of a right form in terms of the natural crystals habit. For example, the artificial diamond obtained by using nickel as a catalyst is always colored yellowish green. In addition, if the transformation temperature rises beyond a certain point, then feather-like or dentritic crystals tend to develop. On the contrary, if the temperature drops below that certain point, only hexahedral crystals with poor transparency can be obtained. Thus, a very precise temperature control is required to maintain the optimum temperature for a given pressure, and the operations involved in this temperature control under the conditions of high temperature and high pressure prove to be very difficult and troublesome. Even if this difficulty of temperature control could be overcome, the grain diameters of the crystals obtained are usually distributed over a wide range of from ten and several μ to 0.3 mm., and it is practically impossible to constantly obtain the crystals of almost the same grain size. These tendencies are more conspicuous when iron and cobalt considered generally inferior to nickel are used instead.

An object of this invention is to produce pure or nearly colorless and transparent artificial diamond crystals by using a novel catalyst.

Another object of this invention is to produce artificial diamonds excellent in crystal structure, right in natural crystal habit and uniform and relatively large in grain size by using a novel catalyst.

A further object of this invention is to provide an apparatus for producing artificial diamond which is simpler and the production operation easier by lowering the operating pressure and temperature.

The features of the invention which are believed to be novel are set forth with particularity in the appended claims. The invention itself, however, as to its organization together with further objects and advantages thereof, may best be understood by reference to the following description taken in connection with the accompanying drawings, in which;

In the method of the present invention, metallic niobium is used as the catalyst. In addition to simple niobium, the niobium may be used in the form of an alloy with copper, silver, gold, alminium, zinc or tin which are non-catalytic to the diamond forming reaction. Further, when using these alloys, instead of using metals preliminarily alloyed by melting, those mixed with powdered metal components in an amount equal to the desired alloy component may be used. This is because the mixed component metals are molten and alloyed in a reaction vessel during the synthesis. Since these catalysts turn to a melted phase in the synthesis of diamond, it does not matter whether they are incorporated in a massive or powdered form.

As the carbonaceous materials for the artificial diamond, nearly any substances containing carbon in various forms may be used. Graphite is the simplest form of carbon and is the most suitable material for artificial diamonds. However, it is also possible to use amorphous carbon, coal, coke, charcoal, sugar charcoal or carbide containing carbon as its main component, or organic substances containing a large quantity of carbon atoms such as coal tar, pitch, wood, paper, naphthalene, wax or paraffin as material for the production of artificial diamond by this method. Under the conditions of high temperature and pressure these organic substances release free carbon which is thought to be converted into diamond crystals. Furthermore, in addition to these materials, waste fine diamond powders selected from produced artificial diamonds can be taken or mixed with other materials as a re-usable material so as to grow them into larger crystals.

There is practically no limit to the mixing ratio of the carbonaceous material and the catalyst, or to the physical forms of both. Whatever the ratio and form they may be in, the formation and growth of diamond crystals will surely occur on their contact surfaces.

However, carbonaceous materials in a massive form have a tendency of giving diamond crystals of larger grain than those in a powdered form.

Figure 1:
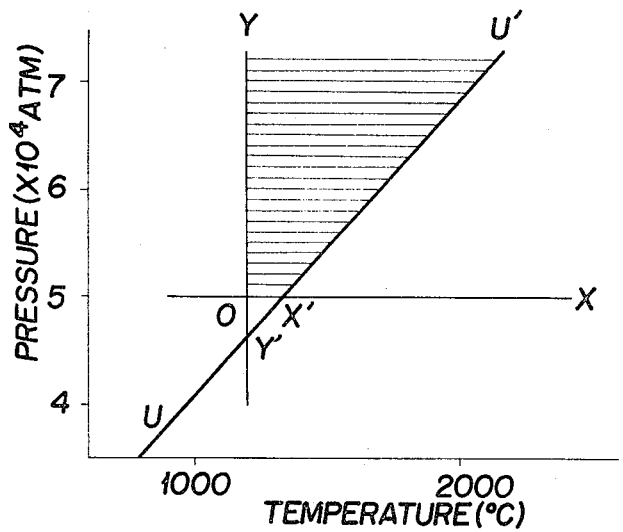
FIG. 1 shows a diagram of diamond-graphite equilibrium line calculated from theory.

The straight line UU' in the diagram of FIG. 1 is a well-known diamond-graphite equilibrium line calculated from the theory which was given by R. Berman and Sir Francis Simon (Zeitschrift für Elektrochemie, 59, 333, 1955). The area enclosed by the three crossing straight lines OX, YO and UU' that is U'X'OY, constitutes the condition necessary to obtain diamond crystals by the process in the present invention method. Line OX means under equal pressure of 50,000 atm., and line YO means under equal temperature of 1,200° C. This thermodynamical condition is independent of the type and form of the catalyst as well as the means of adding pressure and heating.

Although it is not definitely known for what reason niobium added as a catalyst in the present method acts on carbonaceous material, and converts it into diamond crystals, it is believed tht the essential reaction is carried out in the molten mixed phase of both. Thus, it is believed that niobium acts as a solvent to the carbon at an elevated temperature, and dissolves the carbon into the surface layer of carbonaceous material, precipitating this molten carbon which is crystallized as diamond with a high pressure applied to it.

Consequently, it is more advantageous to use niobium alloys of lower melting points, rather than a pure niobium metal of a higher melting point. For instance, the melting point of pure niobium metal is 1,950° C. under normal pressure, while that of niobium-copper alloy is at least 1,100° C. As the alloy metal of the niobium alloys, the copper family elements are most suitable. For example, compared with a pure niobium metal, a niobium-copper alloy is advantageous because it has a preventing property against the formation of a niobium carbide. During the synthetic reaction, a pure niobium metal produces a fairly large amount of its carbide along with diamond, showing a tendency of lowering its catalytic action, whereas with a niobium-copper alloy, niobium-carbide is scarcely produced, and the formation and growth of diamond crystals are satisfactorily advanced.

Not only copper but silver or gold both of which are also copper family elements can be used in the same way as above described. Instead of the copper family elements, aluminum zinc or tin can also be used as the alloy component. On the other hand, the following 12 elements, viz. iron, nickel, cobalt, platinum, palladium, ruthenium, osmium, iridium, rhodium, chromium, manganese and tantalum are not appropriate as the alloy elements with niobium, because these metals have catalytic actions themselves for diamond synthesis, and tend to produce poor quality diamond crystals as described before.

The diamond crystals obtained by the method of this invention have very good appearance and properties. That is, high transparent and colorless crystals can be easily obtained independent of the reaction conditions. As for their grain sizes, generally uniform crystals are secured, being tens of microns if fine graphite is used as carbonaceous material, and being 0.2 to 0.4 mm. if massive graphite is used. Speaking about the structure of the crystals obtained, the photograph of X-rays diffraction of artificial diamond obtained by using a nickel catalyst reveals a diffraction image of so-called satellites which can not be seen in natural diamond crystals, while there is no satellite in the case of crystals obtained by the present method.

Although not clear as to the reason why diamond crystals of high quality can be produced by the present method, the cause nevertheless must be considered, and appears to be that there are fewer chances for defects to originate in the nucleation of diamond crystals with the use of niobium than with the use of such a conventional catalyst as nickel, and that the rate of crystal growth of the former is not greater than the latter. Further, when a nickel catalyst is used, the crystal growth nearly stops usually within 1 minute of the treatment under conditions of high temperature and high pressure. On the contrary, in the process of this invention, the crystals continue to grow for 5 to 20 minutes of treatment under conditions of high temperature and high pressure, and, in fact aided by selecting pressures and temperatures somewhat lower than those used in the conventional method. The slow rate of crystal growth leads to the production of high quality crystals. When nickel or other conventional catalysts are used, the origin of the nucleation of diamond crystals and the rate of its growth can never be controlled even by the reduction of the ratio of the catalyst used.

In order that those skilled in the art may understand how the present invention may be carried into effect the following examples are given by way of illustration. All parts and percentages are by weight.

Example 1

Figure 2:
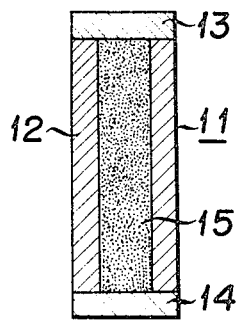
FIG. 2 shows an enlarged sectional vertical view of a treating vessel used in the following examples.

A treating vessel 11 as shown in FIG. 2, consisting of a graphite cylinder 12 of 2 mm. inner diameter, 4 mm. outer diameter and 9.5 mm. length and two graphite disc lids 13, 14 of 4 mm. diameter and 1 mm. thickness was filled with fine powder of niobium metal 15 to serve as a catalyst. This treating vessel 11 was allowed to stand for 5 minutes under a condition of a pressure of 63,000 atm. and a temperature of 1510° to 1710° C. About 2 mg. of transparent and very slightly brownish octahedral diamond crystals having a grain size of 0.2–0.4 mm. were obtained.

Example 2

A treating vessel similar to that in Example 1 was filled with a mixture of 3 parts of graphite powder, 2 parts of niobium powder and 1 part of copper powder. This treating vessel was allowed to stand for 10 minutes under the condition of a pressure of 63,000 atm. and a temperature of 1320–1550° C. Then, thoroughly about 2 mg. of perfectly transparent and octahedral diamond crystals having a grain size of 0.01 to 0.1 mm. were obtained.

Example 3

8 lots of sample are prepared which comprises a mixture of 1 part of niobium powder and 3 parts of copper powder to serve as a catalyst.

Figure 3:
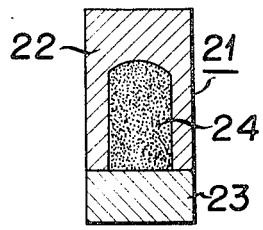
FIG. 3 shows an enlarged sectional vertical view of another treating vessel used in the following examples.
Figure 4:
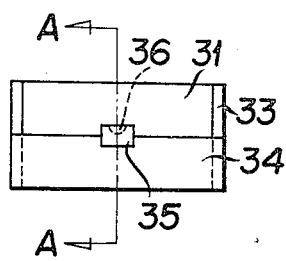
FIG. 4 shows an enlarged vertical view of another treating vessel used in the following examples.
Figure 5:
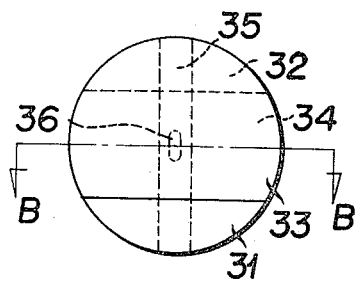
FIG. 5 shows an enlarged horizontal view of the treating vessel shown in FIG. 4.
Figure 6:
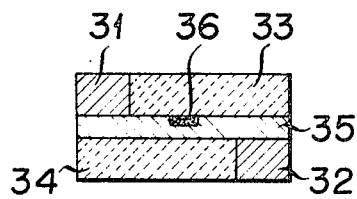
FIG. 6 shows a sectional side view of the treating vessel shown in FIG. 4 according to the line A—A.
Figure 7:
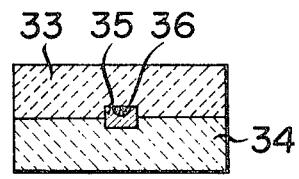
FIG. 7 shows a sectional vertical view of the treating vessel shown in FIG. 5 according to the line B—B.

Each lot of sample was charged into a treating vessel 21 as shown in FIG. 3, consisting of a graphite pillar 22 of 4 mm. diameter and 6 mm. length having a hollow 24 of 25 mm. diameter and 4 mm. depth, covered at the open bottom with a disc lid 23 of 2 mm. thick and 4 mm. diameter. Each treating vessel was allowed to stand for 10 minutes under the condition of properly selected temperature and pressure as shown in the table. Afterwards, the content of each treating vessel was taken out, boiling and washing with each concentrated sulphuric acid, nitric acid and hydrofluoric acid, and then the number of crystal grains of diamond residues of each sample was counted with a microscope, the results are shown in the table. The word "numerous" in the table means that more than 100 crystal grains were observed.

TABLE

| Temp. (° C.) | Pressure (atm.) | Number of grain in the produced diamond |
|---|---|---|
| 1,200 | 53,000 | Several. |
| 1,260 | 50,000 | Several tens. |
| 1,260 | 63,000 | Numerous. |
| 1,330 | 63,000 | Do. |
| 1,390 | 67,000 | Do. |
| 1,400 | 58,000 | Do. |
| 1,420 | 53,000 | Do. |
| 1,420 | 57,000 | Do. |

Example 4

A treating vessel similar to that in Example 2 was filled with a mixture of 3 parts of graphite powder, 1 part of niobium powder and 1 part of tin powder. This treating vessel was allowed to stand for 15 minutes under the condition of a pressure of 70,000 atm. and a temperature of 1,800° C. About 4 mg. of prefectly transparent and colorless octahedral diamond crystals having a grain size of 0.01 to 0.2 mm. were obtained.

Example 5

A treating vessel similar to that in Example 3 was filled with a mixture of equal amounts of niobium, copper and aluminum as a catalyst. This treating vessel was allowed to stand for 15 minutes under the condition of a pressure of 67,000 atm. and a temperature of 1,800° C. About 13 mg. of perfectly transparent and colorless octahedral diamond crystals having a grain size of 0.2 to 0.4 mm. were obtained.

Example 6

A treating vessel similar to that in Example 3 was filled with a mixture of equal amounts of niobium, copper and silver, and was allowed to stand for 5 minutes under the condition of a pressure of 67,000 atm. and a temperature of 1,500° C., and then perfectly transparent, and octahedral diamond crystal of about 7 mg. was obtained, the grain size thereof being 0.2 to 0.4 mm. A treating vessel used in this example is as follows.

As shown in FIG. 4 to FIG. 7, two pyrophylite discs 33, 34 of 6 mm. diameter and 1.6 mm. thick, which were partially connected with semi-circular graphite plates 31, 32 respectively, are piled on each other. Along the center line in the contact surface, there is cut a groove and a square rod of graphite 35 having a hollow 36 which is to be filled with a catalyst is inserted therein.

When electric current is applied to this treating vessel under a high voltage, it runs from the semi-circular graphite plate 31 to the counterpart plate 32 through the square rod 35, and the contact parts of graphite and catalyst in the hollow 36 is heated by this electric current.

A mixture of equal amounts of niobium powder and copper powder was used as a catalyst, and this treating vessel is allowed to stand for 30 seconds in an atmosphere of a high pressure of 70,000 to 90,000 atm. and a high temperature of 1,800 to 2,500° C.

After the temperature was lowered the sample was taken out and examined. A number of extremely fine crystal grains of diamond was noticed to be produced near the contact area between the catalyst and the graphite square rod. This experiment serves to confirm qualitatively that the catalyst specified by this invention has also the possibility of producing diamond nucleation even under ultra-high temperature and pressure during extremely short time. But industrially, it is better to achieve the slow growth of crystals under a condition of relatively low pressure and temperature, taking the treating time of 5 to 15 minutes as mentioned before.

Example 7

Figure 8:
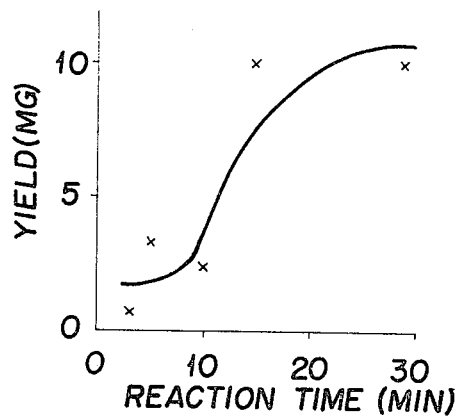
FIG. 8 shows a diagram of relation curve between diamond yield and reaction time in the following examples.

A treating vessel similar to that in Example 3 was filled with a mixture of equal amounts of niobium and copper to serve as a catalyst. Under the condition of a pressure of 70,000 atm. and a temperature of 1,700° C., this treating vessel was allowed to stand separately for different passing time within the range of 2 to 30 minutes, and the relationship of the treating time with the yield of product was investigated. The results of the experiment are given in FIG. 8. The curve in FIG. 8 indicates that the diamond forming reaction proceeds mainly during the period of 5 to 15 minutes of the reaction time.

As already described, when a nickel catalyst is used, the reaction always completes within several tens seconds, and can not be delayed anyhow.

Example 8

When using any alloy of niobium and copper as a catalyst in the present invention, one experiment was made to see the relation between the yield of diamond and the mixing ratio of niobium and copper.

Figure 9:
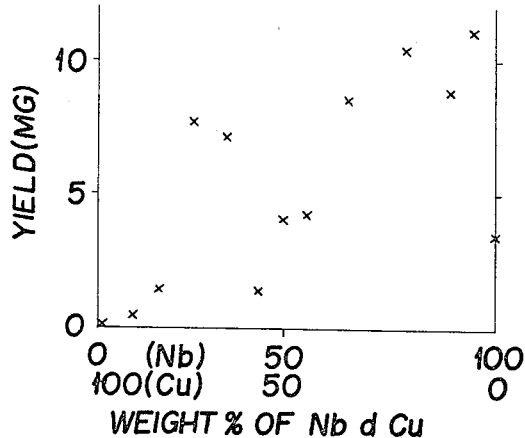
FIG. 9 shows a plotted graph of diamond yield and catalyst components in the following examples.

The results of the experiment are given in FIG. 9. The plots in FIG. 9 shows that no grain of diamond was produced by using copper only as a catalyst, a content of niobium as low as 10% is sufficient to form diamond crystals. It is also clear from FIG. 9 that diamond can be produced by using niobium only as a catalyst, but by using niobium catalyst mixed with any amount of copper a big amount of diamond crystals can be produced.

In the diffraction images, which were taken of the diamond crystals obtained in each of the above examples for two exposures under the condition of Cu Kα ray, 40 kv. and 20 ma. There were all the distinct diffraction images peculiar to diamond crystal, but no satellites could be observed at all.

Further, by the quantitative analysis of the impurities in the diamond crystals obtained, the content ratio of niobium was only 0.01 to 0.10%.

In comparison, the diffraction or iron photograph, which was taken of diamond crystals obtained by using nickel or iron catalyst for twenty minutes exposure under the condition of Cu Kα ray, 35 kv. and 20 ma., presented diffraction images, viz. satellites, of 200, 220 and 311 corresponding to the lattice constant 3.54 A. of diamond, and those satellites were proven to be co-axial with the diamond. Usually, 0.3 to 1.0% of the catalyst metal are contained as an impurity in the artificial diamond crystals obtained by using nickel or iron catalyst.

It will be understood that various changes and modifications may be made without departing from the scope of the invention as defined in the appended claims. It is intended, therefore, that all the matter contained in the foregoing description and in the drawings is to be interpreted as illustrative only and not as limitative of the invention.

What is claimed is:

1. In the method of converting a carbonaceous material into diamond by allowing the carbonaceous material to stand in the presence of a catalyst for a time sufficient to produce diamond crystals using a catalyst under an ultra-high pressure and temperature, the improvement therein which comprises using substantially only niobium metal as the catalyst under a pressure of over 50,000 atm. and a temperature of over 1,200° C.

2. The method according to claim 1 wherein the time required for the conversion ranges from 5 to 15 minutes.

3. In the method of converting a carbonaceous material into diamond by allowing it to stand for a time sufficient to produce synthetic diamond crystals using a catalyst under an ultra-high pressure and an ultra-high temperature, the improvement therein which comprises using as the catalyst an alloy of niobium and another metal selected from the metal group consisting of copper, silver, gold, aluminum, zinc, tin, under a pressure of over 50,000 atm. and a temperature of over 1,200° C.

4. The method according to claim 3 wherein the time required for the conversion ranges from 5 to 15 minutes.

5. In the method of converting a carbonaceous material into diamond by allowing it to stand for a time sufficient to produce synthetic diamond crystals using a catalyst under an ultra-high pressure and an ultra-high temperature, the improvement therein which comprises using as the catalyst a mixture of niobium metal and another metal selected from the metal group consisting of copper, silver, gold, aluminum, zinc, tin, under a pressure of over 50,000 atm. and a temperature of over 1,200° C.

6. The method according to claim 5 wherein the time required for the conversion ranges from 5 to 15 minutes.

References Cited

UNITED STATES PATENTS

| | | | |
|---|---|---|---|
| 2,947,609 | 8/1960 | Strong | 23—209.1 |
| 3,334,968 | 8/1967 | Ishizuka | 23—209.1 |
| 3,346,102 | 10/1967 | Strong | 23—209.1 |

EDWARD J. MEROS, *Primary Examiner.*